(12) United States Patent
Jin et al.

(10) Patent No.: US 8,730,799 B2
(45) Date of Patent: May 20, 2014

(54) DYNAMIC ADJUSTMENT OF RECEIVE WINDOW UTILIZED BY A TRANSMITTING DEVICE

(75) Inventors: Cheng Jin, Pasadena, CA (US); George S. Lee, San Marino, CA (US); Steven Low, La Canada, CA (US); Darren Ng, Pasadena, CA (US); Ryan Witt, New York, NY (US)

(73) Assignee: Akamai Technologies, Inc., Cambridge, MA (US)

( * ) Notice: Subject to any disclaimer, the term of this patent is extended or adjusted under 35 U.S.C. 154(b) by 407 days.

(21) Appl. No.: 13/040,214

(22) Filed: Mar. 3, 2011

(65) Prior Publication Data

US 2011/0216650 A1 Sep. 8, 2011

Related U.S. Application Data

(60) Provisional application No. 61/310,244, filed on Mar. 3, 2010.

(51) Int. Cl.
*H04L 12/26* (2006.01)
*H04J 1/16* (2006.01)
*H04J 3/14* (2006.01)

(52) U.S. Cl.
USPC ............................ 370/230; 370/232; 370/235

(58) Field of Classification Search
USPC ................. 370/229, 230, 235, 351, 389–392, 370/395.5–395.52, 469, 473
See application file for complete search history.

(56) References Cited

U.S. PATENT DOCUMENTS

| 2008/0075000 A1* | 3/2008 | Robbins | 370/229 |
| 2008/0081651 A1* | 4/2008 | Kuroda et al. | 455/509 |
| 2009/0300211 A1* | 12/2009 | Gallagher et al. | 709/235 |
| 2011/0158253 A1* | 6/2011 | Dukkipati et al. | 370/465 |

FOREIGN PATENT DOCUMENTS

EP   1642427 B1 * 11/2012

OTHER PUBLICATIONS

Peterson et al., TCP Sliding Windows, with Flow Control, and Congestion Control (http://web.cs.wpi.edu/~rek/Undergrad_Nets/C02/TCP_SlidingWindows.pdf).*
Feng et al., *Dynamic Right-Sizing: An Automated, Lightweight, and Scalable Technique for Enhancing Grid Performance*, Proceedings of the 7th International Workshop on Protocols for High-Speed Networks, Berlin, Germany, Apr. 22-24, 2002, 16 pgs.

* cited by examiner

*Primary Examiner* — Abdullah Riyami
*Assistant Examiner* — Brian Cox
(74) *Attorney, Agent, or Firm* — Morgan, Lewis & Bockius LLP

(57) ABSTRACT

A method of controlling size of a receive window includes, at a transmitting device, transmitting packets over a communication channel from the transmitting device to a receiver, receiving acknowledgment packets from the receiver corresponding to the transmitted packets, determining a backlog parameter for the receiver in accordance with a parameter value in the received acknowledgment packets, resetting the size of the receive window in accordance with a function of a current size of the receive window and the backlog parameter, and after the resetting, transmitting packets over the communication channel from the transmitting devices to the receiver in accordance with the reset size of the receive window.

31 Claims, 6 Drawing Sheets

DYNAMIC ADJUSTMENT OF RECEIVE WINDOW UTILIZED BY A TRANSMITTING DEVICE

RELATED APPLICATION

This application claims priority to U.S. Provisional Application Ser. No. 61/310,244, filed Mar. 3, 2010, which is incorporated by reference herein in its entirety.

TECHNICAL FIELD

The disclosed embodiments relate generally to transmitting data via communication networks. More particularly, the disclosed embodiments relate to dynamically controlling size of the receive window utilized by a transmitting device.

BACKGROUND

Operating systems typically specify a default Transmission Control Protocol (TCP) receive window parameter that limits the number of packets each TCP flow can receive at any instance. For example, the default TCP receive window parameter for a system using Window XP or earlier versions is typically 64 KB. The default TCP receive window parameter prevents a TCP sender from overwhelming the receiver by sending more packets than the receiver can adequately handle. Initially, a default TCP receive window value is communicated to a sender through a receive window parameter, sometimes herein called the rwnd parameter, in each acknowledgment (ACK) packet. When subsequent ACKs are transmitted to the sender, the value of the receive window parameter (sometimes called the advertised receive window) in those ACKs is set to the default TCP receive window value minus the backlog in the receiver buffer, and represents space available in the receiver's buffer for new packets. Accordingly, a sender is not to send more than advertised receive window amount of data. Because computer hardware has become exponentially faster over the years, and memory for buffers has become less expensive, receivers can typically accept a more data from the sender than indicated by the default TCP receive window parameter.

SUMMARY

In order to maximize the amount of data transmitted to a receiver without overwhelming the receiver, the size of the receive window can be dynamically controlled to allow the sender to send more packets at any one time than is specified by the rwnd parameter.

A method of controlling size of a receive window includes, at a transmitting device, transmitting packets over a communication channel from the transmitting device to a receiver, receiving acknowledgment packets from the receiver corresponding to the transmitted packets, determining a backlog parameter for the receiver in accordance with a parameter value in the received acknowledgment packets, resetting the size of the receive window in accordance with a function of a current size of the receive window and the backlog parameter, and after the resetting, transmitting packets over the communication channel from the transmitting devices to the receiver in accordance with the size of the receive window.

In some embodiments, the method includes determining the backlog parameter for the receiver in accordance with a difference between the parameter value in the received acknowledgment packets and a predefined threshold. The parameter value in the received acknowledgment packets may comprise a receive window value generated by the receiver.

In other embodiments, the method further includes determining a current round trip time for the transmitted packets, and resetting the size of the receive window in accordance with a scaling factor, the current round trip time, the current size of the receive window, and the backlog parameter. In some embodiments, the method also includes determining the scaling factor, wherein the scaling factor is a nominal round trip time. In other embodiments, the method includes determining the scaling factor, wherein the scaling factor has a first value when the backlog parameter's value corresponds to a backlog at the receiver that is greater than a predefined threshold, the scaling factor has a second value when the backlog parameter's value corresponds to a backlog at the receiver that is less than a predefined threshold, and the second value is less than the first value.

In some embodiments, the resetting includes maintaining the current size of the receive window when the backlog parameter is within a predefined value range. Optionally, the size of the receive window is reset once every round trip time. In other embodiments, the method includes resetting the size of the receive window periodically.

In some embodiments, the method includes determining a congestion window size in accordance with one or more measurements of network congestion, and determining a transmission window size in accordance with both the congestion window size and the receive window size.

An apparatus for controlling size of a receive window includes a transceiver to transmit packets over a communication channel to a receiver, and to receive acknowledgement packets from the receiver corresponding to the transmitted packets, one or more processors, and memory for storing instructions to be executed by the one or more processors. The stored instructions include instructions to determine a backlog parameter for the receiver in accordance with a parameter value in the received acknowledgment packets, instructions to reset the size of the receive window in accordance with a function of a current size of the receive window and the backlog parameter, and instructions to transmit packets over the communication channel to the receiver in accordance with the reset size of the receive window.

In some embodiments, the apparatus' memory includes instructions to determine the backlog parameter for the receiver in accordance with a difference between the parameter value in the received acknowledgment packets and a predefined threshold.

In some embodiments, the apparatus' memory includes instructions to determine a current round trip time for the transmitted packets and reset the size of the receive window in accordance with a scaling factor and the current round trip time. In some embodiments, the apparatus' memory includes instructions to determine the scaling factor, wherein the scaling factor is a nominal round trip time. In other embodiments, the apparatus' memory includes instructions to determine the scaling factor, wherein the scaling factor has a first value when the backlog parameter's value corresponds to a backlog at the receiver that is greater than a predefined threshold, the scaling factor has a second value when the backlog parameter's value corresponds to a backlog at the receiver that is less than a predefined threshold, and the second value is less than the first value.

In some embodiments, the instructions to reset the size of the receive window include instructions to maintain the current size of the receive window when the backlog parameter is within a predefined value range. In some embodiments, the instructions to reset the size of the receive window are executed once every round trip time. In other embodiments, the instructions to reset the size of the receive window are executed periodically (e.g., once every N milliseconds, where N is typically in the range 10 to 200).

In some embodiments, the apparatus' memory further includes instructions to determine a congestion window size in accordance with one or more measurements of network congestion, and determine a transmission window size in accordance with both the congestion window size and the receive window size.

A computer readable storage medium stores one or more programs for execution by one or more processors of an apparatus, which includes a transceiver to transmit packets over a communication channel to a receiver and to receive acknowledgment packets from the receiver corresponding to the transmitted packets. The one or more programs are for execution by one or more processors of the apparatus so as to perform a method that includes determining a backlog parameter for the receiver in accordance with a parameter value in the acknowledgment packets received by the apparatus, resetting the size of a receive window in accordance with a function of a current size of the receive window and the backlog parameter, and after the receive window size is reset, transmitting packets over the communication channel to the receiver in accordance with the reset size of the receive window.

In some embodiments, the method performed by execution of the one or more programs includes determining the backlog parameter for the receiver in accordance with a difference between the parameter value in the received acknowledgment packets and a predefined threshold.

In some embodiments, the method performed by execution of the one or more programs also includes determining a current round trip time for the transmitted packets resetting the size of the receive window in accordance with a scaling factor and the current round trip time. In some embodiments, the method includes determining the scaling factor, wherein the scaling factor is a nominal round trip time. In some embodiments, the scaling factor has a first value when the backlog parameter's value corresponds to a backlog at the receiver that is greater than a predefined threshold, the scaling factor has a second value when the backlog parameter's value corresponds to a backlog at the receiver that is less than a predefined threshold, and the second value is less than the first value.

In some embodiments, resetting the size of the receive window includes maintaining the current size of the receive window when the backlog parameter is within a predefined value range. In some embodiments, the method performed by execution of the one or more programs includes resetting the size of the receive window every round trip time. In other embodiments, the method includes resetting the size of the receive window periodically.

In some embodiments, the method performed by execution of the one or more programs includes determining a congestion window size in accordance with one or more measurements of network congestion, and determining a transmission window size in accordance with both the congestion window size and the receive window size.

A method of controlling the transmission of messages from a sender to a recipient over a network includes, at a transmitting device, receiving acknowledgment packets from the receiver corresponding to the transmitted packets, determining a backlog parameter for the receiver in accordance with a parameter value in the received acknowledgment packets, determining a queuing delay in accordance with the received acknowledgment packets, resetting a size of a congestion window in accordance with a function of a current size of the congestion window and the queuing delay, resetting a size of a receive window in accordance with a function of a current size of the receive window and the backlog parameter, comparing the size of the congestion window and the size of the receive window, resetting a size of a network window in accordance with the smaller of the size of the congestion window and the size of the receive window, and transmitting packets over the network from the sender to the recipient in accordance with the size of the network window.

An apparatus for controlling the transmission of messages from a sender to a recipient over a network includes a congestion window control block (congestion window control means) configured to reset a size of a congestion window in accordance with a function of a current size of the congestion window and a queuing delay, a receive window control block (receive window control means) configured to reset a size of a receive window in accordance with a function of a current size of the receive window and a backlog parameter, a compare block (compare means) configured to compare the size of the congestion window and the size of the receive window, a network control block (network control means) configured to reset a size of a network window in accordance with the smaller of the size of the congestion window and the size of the receive window, and a transmitter to transmit packets over the network from the sender to the recipient in accordance with the size of the network window.

A computer readable storage medium stores one or more programs for execution by one or more processors of an apparatus that includes a transceiver to transmit packets over a communication channel to a receiver and to receive acknowledgment packets from the receiver corresponding to the transmitted packets. The one or more programs are for execution by one or more processors of the apparatus so as to perform a method comprising receiving acknowledgment packets from the receiver corresponding to the transmitted packets, determining a backlog parameter for the receiver in accordance with a parameter value in the received acknowledgment packets, determining a queuing delay in accordance the received acknowledgment packets, resetting a size of a congestion window in accordance with a function of a current size of the congestion window and the queuing delay, resetting a size of a receive window in accordance with a function of a current size of the receive window and the backlog parameter, comparing the size of the congestion window and the size of the receive window, resetting the size of a network window in accordance with the smaller of the size of the congestion window and the size of the receive window, and after the network window size is reset, transmitting packets over the communication channel to the receiver in accordance with the reset size of the network window.

BRIEF DESCRIPTION OF THE DRAWINGS

Like reference numerals refer to corresponding parts throughout the drawings.

DESCRIPTION OF EMBODIMENTS

Figure 1:
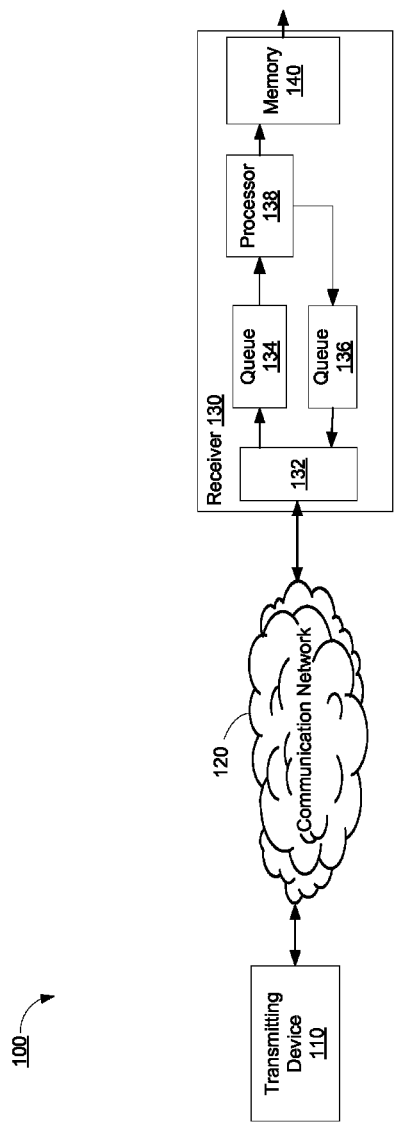
FIG. 1 is a block diagram illustrating a system for controlling the size of a receive window in accordance with some embodiments of the present invention.

FIG. 1 is a block diagram illustrating a system 100 for controlling the size of a receive window. A transmitting device 110 transmits packets to a receiver 130 via a communication network 120 in accordance with a network window wnd (not shown). The transmitting device 110 also receives acknowledgment packets (ACKs) from the receiver 130 via the communication network 120. Transmitting device 110 may also be referred to herein as a transceiver, as it both transmits and receives information.

The network window wnd corresponds to the amount of outstanding data (unacknowledged by the recipient) the transmitting device 110 can send on a particular connection before it gets acknowledgment packets (ACKs) back from the receiver 130. A dynamically calculated receive window, fp_rwnd (not shown), corresponds to the amount of data that the transmitting device 110 can send to the receiver 130. The size of the receive window, fp_rwnd, is dynamically adjusted by the transmitter in response to receiver 130 conditions, and is calculated as described below in relation to FIG. 2. A congestion window cwnd corresponds to the amount of data that the transmitting device 110 can send over the communication network 120. The size of the congestion window, cwnd, is dynamically adjusted by the transmitter in response to communication network 120 conditions. In some embodiments, the size of the congestion window, cwnd, is calculated according to the FAST TCP congestion control algorithm. In other embodiments, the size of the congestion window, cwnd, may be calculated by the transmitter according to any other TCP window control algorithm (e.g., TCP Reno). In some embodiments, the size of the network window, wnd, is set to the minimum of the congestion window, cwnd, and the receive window, fp_rwnd.

The communication network 120 may be any local area network (LAN) and/or wide area network (WAN), such as an intranet, an extranet, the Internet, or a combination of such networks. It is sufficient that the communication network 120 provides communication capability between the transmitting device 110 and the receiver 130. In some embodiments, the communication network 120 transports packets using FAST Transmission Control Protocol (FAST TCP).

The communication network 120 is connected to the receiver 130 during transmission of packets between transmitter 110 and receiver 130. Receiver 130 may include a communication interface 132, a plurality of buffers or queues 134 and 136, a processor 138, and memory 140. Receiver 130 receives and processes the packets transmitted by transmitting device 110. The transmitted packets are received at communication interface 132 and stored in buffer or queue 134 before being processed by processor 138. Once processed, the transmitted packets are stored in memory 140 where the data may be accessed and used by a recipient system (not shown). Processor 138 also generates acknowledgment packets (ACKs) corresponding to each of the transmitted packets. The ACKs include a parameter value rwnd, sometimes called the advertised receive window, that corresponds generally to the size of buffer 134 minus the amount of data (sometimes called the backlog) waiting in buffer 134 to be processed (e.g., awaiting delivery to an application). As described below in relation to FIG. 2, the received parameter value rwnd is used by the transmitting device 110 to control the size of the receive window. The ACKs are stored in buffer or queue 136 pending transmission to the transmitting device 110 by the communication interface 132 via communication network 120.

Figure 2:
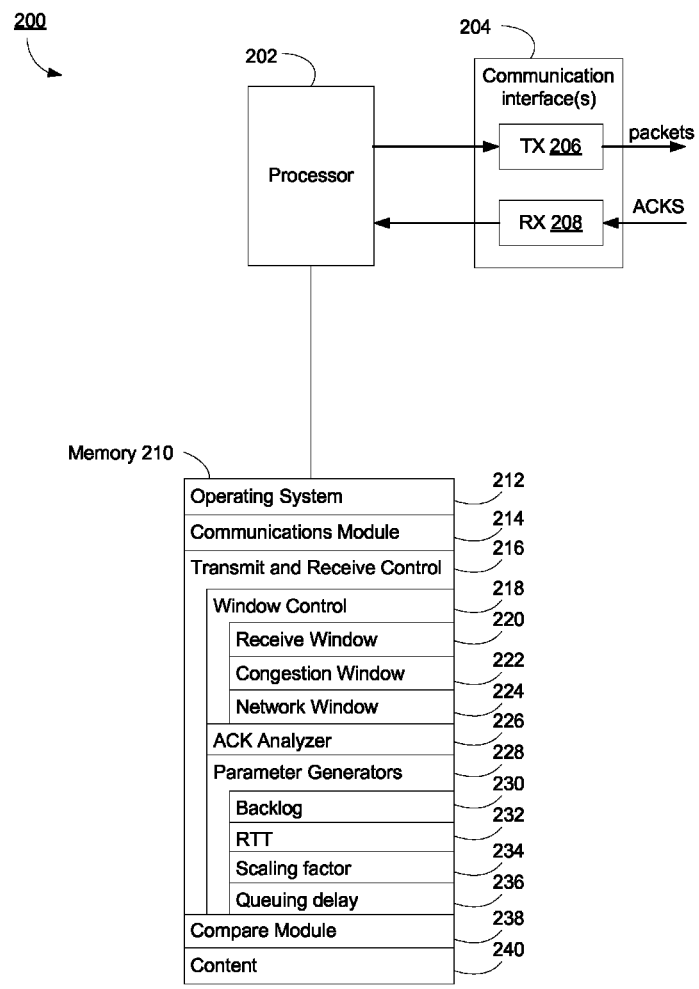
FIG. 2 is a block diagram illustrating an exemplary transmitting device in accordance with some embodiments of the present invention.

FIG. 2 is a block diagram of an exemplary transmitting device 200 in accordance with some embodiments. Transmitting device 200 is an example of transmitting device 110 (FIG. 1). As shown in FIG. 2, transmitting device 200 typically includes one or more processing units 202, one or more network or other communication interfaces 204, and memory 210. In some embodiments, communication interfaces 204 include a transmitter (TX) 206 for transmitting packets to a receiver (e.g., receiver 130, FIG. 1). Communication interfaces 204 may also include a receiver (RX) 208 for receiving ACKs from a receiver (e.g., receiver 130, FIG. 1).

Memory 210 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 210 may optionally include one or more storage devices remotely located from processor 202. Memory 210, or alternately the non-volatile memory device(s) within memory 210, comprises a computer readable storage medium. In some embodiments, memory 210 or the computer readable storage medium of memory 210 stores the following programs, modules and data structures, or a subset thereof:

- an operating system 212 that includes procedures for handling various basic system services and for performing hardware dependent tasks;
- a communications module 214 that is used for connecting the transmitting device 200 to a receiver via the one or more communication interfaces 204 (wired or wireless) and one or more communication networks, such as the Internet, other wide area networks, local area networks, metropolitan area networks, and so on;
- transmit and receive control modules 216 that include a window control module 218, an ACK analyzer 226, and parameter generators 228;
- a compare module 238; and
- content 240, which includes data to be transmitted.

The ACK analyzer 226 analyzes the ACK packets received from a receiver (e.g., receiver 130, FIG. 1) to determine which transmitted packets were successfully received and to extract the parameter value rwnd embedded in the received ACK packets. As stated above, rwnd corresponds generally to the size of receiver buffer 134 (FIG. 1) minus the amount of data in the receiver buffer waiting to be processed by the receiver 130 (FIG. 1).

The parameter generators 228 may include a backlog parameter generator 230, a round trip time (RTT) generator 232, a scaling factor generator 234, and a queuing delay generator 236.

The backlog parameter generator 230 generates a backlog parameter β for use by the window control module 218 to reset the size of a receive window fp_rwnd(t). The backlog parameter β(t) is a function of rwnd(t) and an estimated default TCP receive window parameter B(t), such that:

$$\beta(t) = rwnd(t) - \eta B(t) \quad \text{(Eq. 1)}$$

where $\eta \in (0,1)$. In one example, $\eta = 0.75$. B(t) is defined as an estimate, produced by the transmitter, of the size of the receive buffer in the receiver, or equivalently, as an estimate of the default TCP receive window advertized by the receiver in acknowledgement packets. In some embodiments, B(t) is set equal to the maximum advertised receive window value, rwnd, in the ACK packets received by the transmitting device 110 so far. Alternatively, B(t) is set equal to (or, alternatively, to a value corresponding to) the maximum rwnd value observed in all received ACK packets if the number of received ACK packets is less than N, and otherwise in the last N received ACK packets, where N is a large number, such as 1000, or 10,000 or the like. In yet other embodiments, B(t) is set equal to (or, alternatively, to a value corresponding to) the greater of a predefined value, such as 64 KB or other default receive window size, and the maximum rwnd value observed in all or a predefined subset of all received ACK packets. In some embodiments the operating system of the receiver can dynamically change the size of the receiver buffer. By using an estimated default TCP receive window parameter B(t) that is time varying, the window control module 218 is able to track any changes in the receive buffer at the receiver.

The RTT generator 232 generates a current round trip time value, RTT(t), for use by the window control module 218 to control both the size of the dynamically generated receive window fp_rwnd(t) and a size of the dynamically generated congestion window cwnd(t). Generally, RTT(t) is the time required for a transmitted packet to travel from the transmitting device 200 to the receiver and for a corresponding ACK to travel back from the receiver to the transmitting device 200.

The scaling factor generator 234 generates a scaling factor δ for use by the window control module 218 to control the size of the dynamically generated receive window fp_rwnd(t). The scaling factor δ can be set according to desired system features (e.g., fast or slow increment or decrement). In some embodiments, the scaling factor δ is the nominal RTT, measured in milliseconds (ms). In some embodiments, scaling factor δ will have different values depending on the desired rate of increase or decrease of the size of the receive window fp_rwnd(t). For example, in situations where the value of backlog parameter β(t) is greater than a predefined threshold (e.g., a maximum desired backlog at the receiver), it may be desirable to decrement the size of the receive window fp_rwnd(t) much faster than it is incremented. In this case, scaling factor δ may be $\delta_d$ for decrement and for $\delta_i$ increment with $\delta_d$ greater than $\delta_i$.

The queuing delay generator 236 generates a queuing delay q(t) for use by the window control module 218 to control the size of the congestion window cwnd(t). Generally, queuing delay q(t) is the time a packet waits in a queue at a bottleneck (e.g., a network or receiver bottleneck) until it can be processed.

As shown in FIG. 2, the window control module 218 may include a receive window control module 220, a congestion window control module 222, and a network window control module 224.

The receive window control module 220 is used for controlling the size of a receive window fp_rwnd. In this regard, the receive window control module 220 resets the size of the receive window fp_rwnd such that:

$$\text{fp\_rwnd}(t) = \text{fp\_rwnd}(t-1) + \frac{\delta}{RTT(t)}\beta(t) \qquad \text{(Eq. 2)}$$

where fp_rwnd(t−1) is the current size of the receive window. The increment or decrement of the receive window fp_rwnd is scaled by the ratio of the scaling factor δ to the RTT(t).

Alternatively, in equation 2, the RTT(t) and β(t) values are replaced by RTT(t−1) and β(t)

The receive window control module 220 works to stabilize the size of the receive window fp_rwnd(t) around a value that is η percent of the estimated TCP receive window parameter B(t). For example, if B(t) is 64 KB and η is ¾, then the algorithm attempts to stabilized fp_rwnd(t) to within a predefined range (e.g., plus or minus 10%) around 48 KB (e.g., between 45 KB and 51 KB). If the receive window fp_rwnd(t) is within the predefined range, the size of the receive window fp_rwnd(t) is maintained.

In some embodiments, the size of the receive window fp_rwnd is reset (i.e., recomputed, based on the most recently determined RTT(t), rwnd(t) and B(t) values) once every round trip time. In other embodiments, the size of the receive window fp_rwnd is reset periodically (e.g., once every N milliseconds, where N is typically in the range 10 to 200). In further embodiments, the size of the receive window fp_rwnd is reset once every other round trip time.

The congestion window control module 222 is used for controlling the size of the congestion window cwnd(t). In some embodiments, the congestion window control module 222 resets the size of the congestion window cwnd(t) in accordance with a function of a current size of the congestion window cwnd(t−1) and the queuing delay q(t). In some embodiments, the congestion window cwnd(t) is updated at predefined times (e.g., when the receive window is updated) in accordance with:

$$cwn(t) = cwnd(t-1) - \gamma\left(\frac{q(t)}{RTT(t)}cwnd(t-1) - \alpha\right) \qquad \text{(Eq. 3)}$$

wherein γ is a parameter that scales the adjustments to the congestion window, and α is a parameter that determines the equilibrium point of the congestion window.

The network window control module 224 is used for controlling the size of the network window wnd(t). The network window control module 224 resets the size of the network window wnd(t) to the minimum of the reset size of the congestion window cwnd(t) and the reset size of the receive window fp_rwnd(t):

$$wnd(t)=\min\{cwnd(t), \text{fp\_rwnd}(t)\} \qquad \text{(Eq. 4)}$$

As stated above, the transmitting device 200 transmits packets to the receiver in accordance with network window wnd(t). Accordingly, when the reset size of the receive window fp_rwnd(t) is less than the congestion window cwnd(t), the transmitting device 200 transmits packets over a communication channel (e.g., communication channel 120) to the receiver in accordance with the reset size of the receive window fp_rwnd(t). Conversely, when the reset size of the receive window fp_rwnd(t) is greater than the reset size congestion window cwnd(t), the transmitting device 200 transmits packets over the communication channel to the receiver in accordance with the reset size of the congestion window cwnd(t).

Each of the above identified elements may be stored in one or more of the previously mentioned memory devices. The applications, functions, modules, and operating systems shown in FIG. 2 correspond to a set of instructions for performing the functions described above. The set of instructions can be executed by one or more processors (e.g., processor 202). The above identified modules or programs (i.e., sets of instructions) need not be implemented as separate software programs, procedures or modules, and thus various subsets of these modules may be combined or otherwise re-arranged in various embodiments. In some embodiments, memory 210 may store a subset of the modules and data structures identified above. Furthermore, memory 210 may store additional modules and data structures not described above.

Although FIG. 2 shows a "transmitting device," FIG. 2 is intended more as functional description of the various features which may be present in the transmitting device 200. In practice, and as recognized by those of ordinary skill in the art, items shown separately could be combined and some items could be separated.

Figure 3:
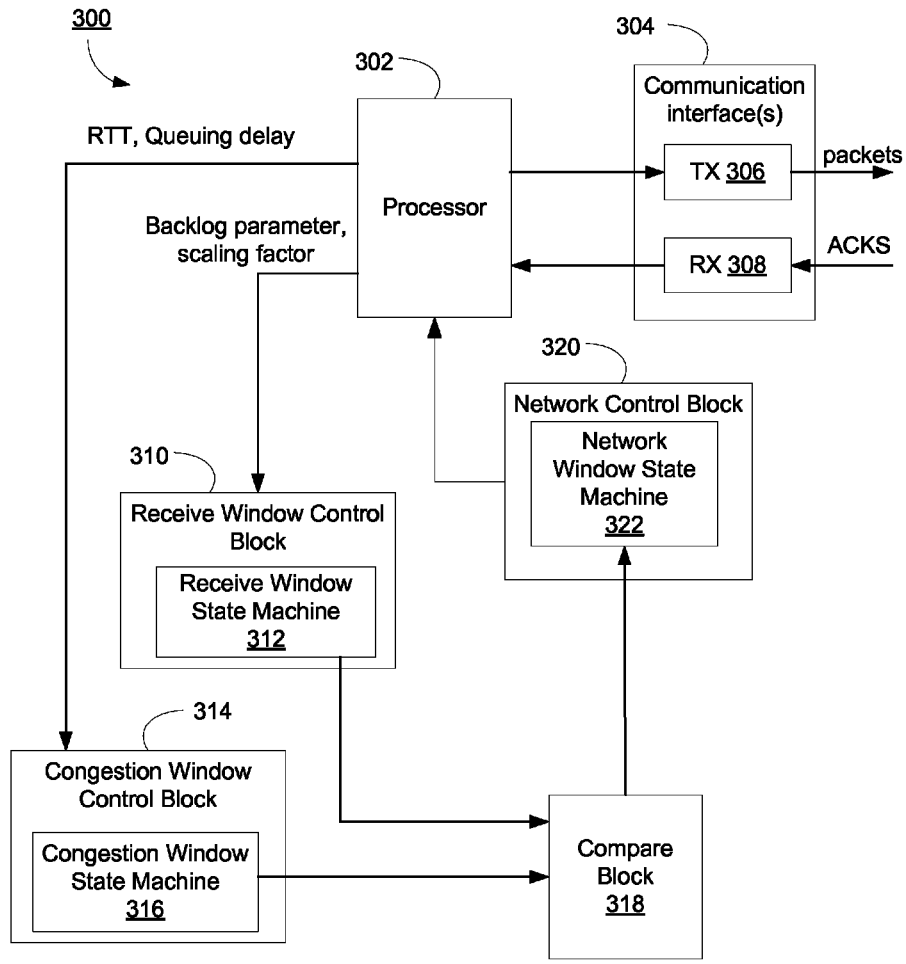
FIG. 3 is a block diagram illustrating a exemplary transmitting device in accordance with some embodiments of the present invention.

FIG. 3 illustrates an exemplary transmitting device 300 in accordance with some embodiments. Transmitting device 300 is an example of transmitting device 110 (FIG. 1). As shown in FIG. 3, transmitting device 300 includes one or more processing units 302, one or more network or other communication interfaces 304, a receive window control block 310, a congestion window control block 314, a compare block 318, and a network control block 320. In some embodiments, communication interfaces 304 include a transmitter (TX) 306 for transmitting packets to a receiver (e.g., receiver 130, FIG. 1). Communication interfaces 304 may also include a receiver (RX) 308 for receiving ACKs from a receiver (e.g., receiver 130, FIG. 1).

Similar to transmitting device 200 (FIG. 2), processor 302 generates several parameters, including round trip time RTT (t), queuing delay q(t), backlog parameter β(t), and a scaling factor δ. These parameters are generated as described above in relation to FIG. 2. The transmitting device 300 uses these parameters to control the receive window fp_rwnd, congestion window cwnd, and network window wnd.

As shown in FIG. 3, the receive window control block 310 includes a receive window state machine 312 to update and store the current value of the receive window fp_rwnd (e.g., fp_rwnd(t−1)). The receive window control block 310 receives a backlog parameter β(t) and, in some embodiments, a scaling factor δ from processor 302. The backlog parameter β(t) and, in some embodiments, the scaling factor δ are used by the receive window control state machine 312 to reset (i.e., update or adjust) the size of the receive window fp_rwnd(t) as described above in relation to FIG. 2.

The congestion window control block 314 includes a congestion window state machine 316 to update and store the current value of the congestion window, cwnd (e.g. cwnd(t−1)). The congestion window control block 314 receives a round trip time RTT(t) and a queuing delay q(t) from processor 302. The round trip time RTT(t) and queuing delay q(t) are used by the congestion window state machine 316 to reset (i.e., update or adjust) the size of the congestion window cwnd(t) as described above in relation to FIG. 2.

The compare block 318 compares the size of the receive window fp_rwnd(t) produced by the receive window control block 310 and the size of the congestion window produced by the congestion window control block 314 in order to determine which window is smaller.

The network control state machine 322 resets the size of the network window wnd(t) in accordance with the smaller of the size of the receive window fp_rwnd(t) and the size of the congestion window cwnd(t), and then makes the current size of the network window wnd(t) available to the processor 302. The transmitting device 300 transmits packets to the receiver in accordance with the reset size of the network window wnd(t).

Although FIG. 3 shows a "transmitting device," FIG. 3 is intended more as functional description of the various features which may be present in the transmitting device 300. In practice, and as recognized by those of ordinary skill in the art, items shown separately could be combined and some items could be separated.

Figure 4:
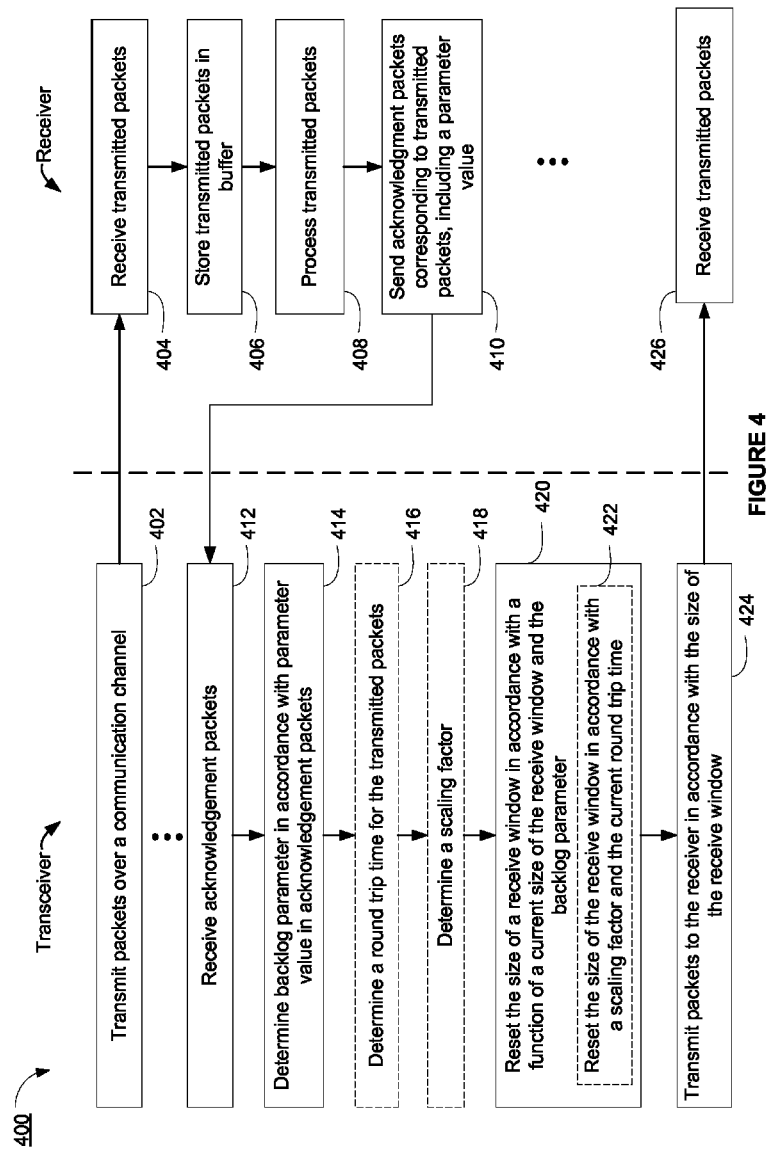
FIG. 4 is a flow diagram illustrating a process for controlling the size of a receive window in accordance with some embodiments of the present invention.

FIG. 4 is a flow chart of a method 400 for controlling size of a receive window. At a transceiver (e.g., transmitting device 110 (FIG. 1)), packets are transmitted over a communication channel (e.g., communication network 120 (FIG. 1)) to a receiver (e.g., receiver 130 (FIG. 1)) (402). As will become apparent from the discussion below, the transceiver transmits the packets in accordance with a current size of a receiving window.

At the receiver, the transmitted packets are received (404) and stored in a buffer (e.g., queue 134 (FIG. 1)) (406). The transmitted packets are processed (408), and the receiver sends back to the transceiver acknowledgment packets (ACKs) corresponding to the transmitted packets, including a receive window parameter value (410). As explained above in connection with FIG. 2, the receive window parameter in the ACKs corresponds to the size of a receiver buffer (e.g., queue 134 (FIG. 1)) minus the amount of data in the receiver buffer waiting to be processed by the receiver. In some embodiments, the size of the receiver buffer changes over time, during the course of a connection. For example, in some embodiments the operating system of the receiver can dynamically change the size of the receiver buffer. When this happens, the value of the receive window parameter in the ACKs sent by the receive will change to reflect the changed size of the receive buffer. The window control mechanism (window control 218) in the transmitter automatically adjusts for any such change in the receive buffer (e.g., by adjusting the value of the estimated default TCP buffer size, B(t)), and thereby tracks the changing size of the receive buffer in the receiver.

At the transceiver, the acknowledgment packets are received (412). A backlog parameter is determined in accordance with the parameter value in the acknowledgement packets (414). In some embodiments, a round trip time for the transmitted packets is determined (416). As described above in connection with FIG. 2, the round trip time is the time required for a transmitted packet to travel from the transmitting device to the receiver and for the corresponding ACKs to travel back from the receiver to the transmitting device. In some embodiments, a scaling factor is determined (418). As described above in relation to FIG. 2, the scaling factor is used to control how quickly the transmitting device increments and decrements the size of the receive window when the rwnd parameter value differs from its equilibrium value.

The method 400 further includes, at the transceiver, resetting (i.e., adjusting) the size of a receive window in accordance with a function of a current size of the receive window and the backlog parameter (420). In some embodiments, the size of the receive window is also reset in accordance with the scaling factor and the current round trip time (422).

Packets are then transmitted to the receiver in accordance with the reset size of the receive window (424). The receiver receives the transmitted packets (426).

Figure 5:
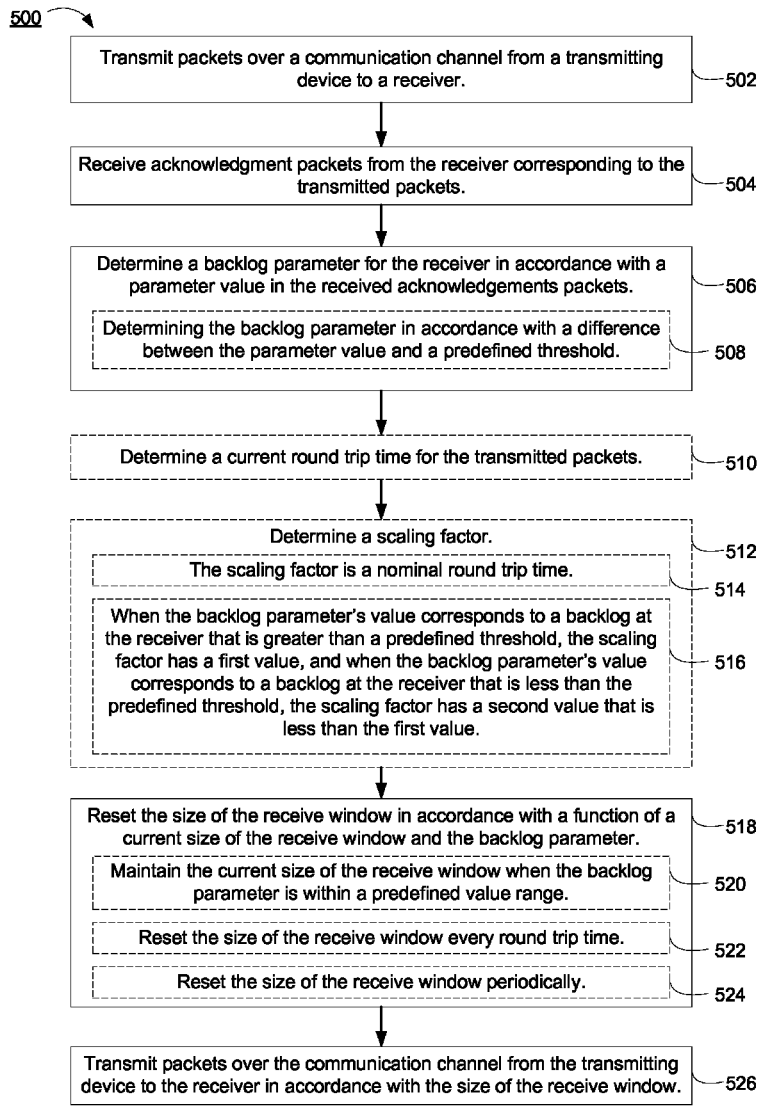
FIG. 5 is a flow diagram illustrating a process for controlling the size of a receive window at a transmitting device in accordance with some embodiments of the present invention.

FIG. 5 is a flow chart of a method 500 for controlling size of a receive window. The following operations are performed at a transmitting device (e.g., transmitting device 110 (FIG. 1)).

The transmitting device transmits packets over a communication channel (e.g., communication network 120 (FIG. 1)) to a receiver (e.g., receiver 130 (FIG. 1)) (502). The transmitting device then receives acknowledgment packets from the receiver corresponding to the transmitted packets (504).

A backlog parameter for the receiver is determined at the transmitting device in accordance with a parameter value in the received acknowledgment packets (506). As explained above in connection with FIG. 2, the parameter value corresponds generally to the size of a receiver buffer (e.g. queue 134 (FIG. 1)) minus the amount of data (sometimes called the backlog) in the receiver buffer that is awaiting processing (e.g., delivery to an application) at the receiver. In some embodiments, the backlog parameter is determined in accordance with a difference between the parameter value and a predefined threshold (e.g., the estimated default TCP receive window parameter B(t)) (508).

In some embodiments, a current round trip time for the packets is determined (510). As described above in connection with FIG. 2, the round trip time is the time required for a transmitted packet to travel from the transmitting device to the receiver and ACKs to travel back.

Additionally, in some embodiments, a scaling factor is determined (512). As described above in relation to FIG. 2, the scaling factor is used to control the increment and decrement of size of the receive window. In some embodiments, the scaling factor is a nominal round trip time (514) (e.g., measured in milliseconds). In other embodiments, when the backlog parameter's value corresponds to a backlog at the receiver that is greater than a predefined threshold, the scaling factor has a first value, and when the backlog parameter's value corresponds to a backlog at the receiver that is less than the predefined threshold, the scaling factor has a second value that is less than the first value (516).

A size of a receive window is reset in accordance with a function of a current size of the receive window and the backlog parameter (518). In some embodiments, the current size of the receive window is maintained when the backlog parameter is within a predefined value range (520). For example, the predefined value range may be values within N percent of a predefined equilibrium value, where N is between 5 and 50, inclusive (N$\in$[5,50]), and more typically N is between 10 and 20, inclusive (N$\in$[10,20]). In some embodiments, the size of the receive window is reset exactly once every round trip time (522). Alternatively, the size of the receive window is reset periodically (524). In yet another alternative, the size of the receive window is reset exactly once every other round trip time.

The transmitting device then transmits packets over the communication channel to the receiver in accordance with the size of the receive window (526).

Figure 6:
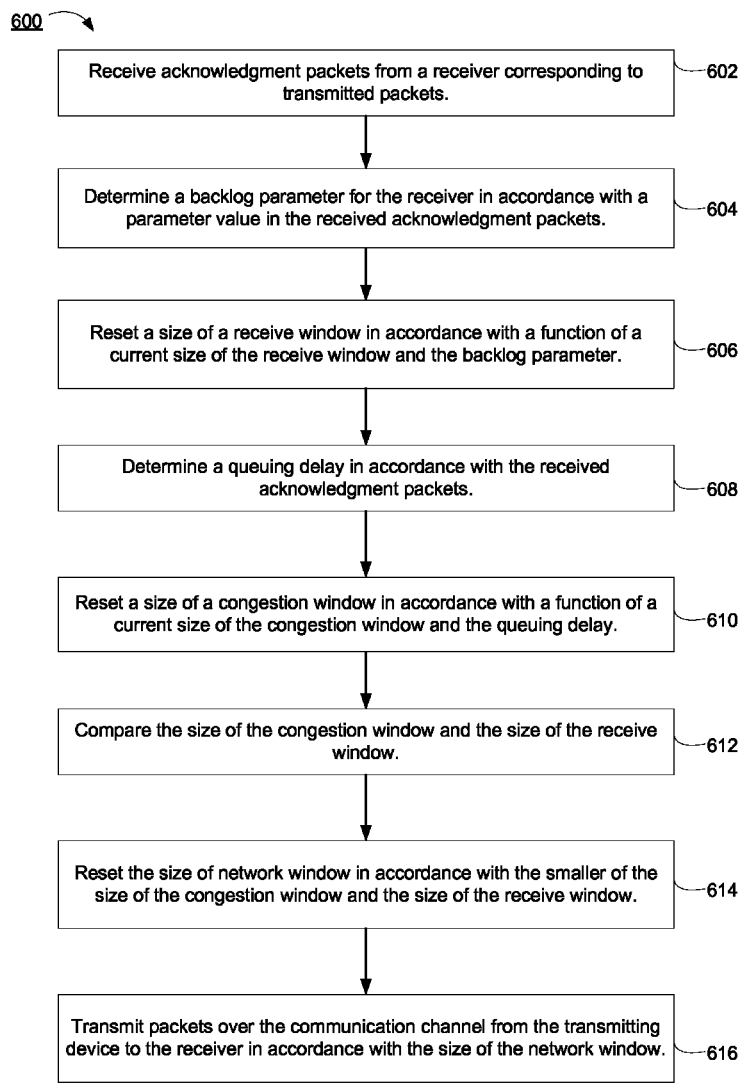
FIG. 6 is a flow diagram illustrating a process for transmitting packets over a communication channel in accordance with some embodiments of the present invention.

FIG. 6 is a flow chart of a method 600 for controlling transmission of messages from a sender (e.g., transmitting device 110 (FIG. 1)) to a recipient (e.g., receiver 130 (FIG. 1)) over a network (e.g., communication network 120 (FIG. 1)) according to some embodiments. The following operations are performed at a transmitting device (e.g., transmitting device 110 (FIG. 1)).

The sender or transmitting device receives acknowledgment packets from the receiver corresponding to transmitted packets (602).

A backlog parameter for the receiver is determined at the transmitting device in accordance with a parameter value in the received acknowledgment packets (604). As explained above in connection with FIG. 2, the parameter value corresponds generally to the size of a receiver buffer (e.g. queue 134 (FIG. 1)) minus the amount of data waiting in the receiver buffer to be processed by the receiver. A size of a receive window is then reset in accordance with a function of a current size of the receive window and the backlog parameter (606).

Additionally, a queuing delay is determined at the transmitting device in accordance with the received acknowledgment packets (608). As discussed above in connection with FIG. 2, the queuing delay equals or corresponds to the difference between an average round trip time of the transmitted packets and a base (i.e., shortest or shortest measured) round trip time of the connection over which transmitted packets are sent to the receiver. A size of a congestion window is then reset is accordance with a function of a current size of the congestion window and the queuing delay (610).

The method 600 further includes comparing the size of the congestion window and the size of the receive window (612). A size of a network window is reset in accordance with the smaller of the dynamically generated size of the congestion window, cwnd, and the dynamically generated size of the receive window, fp_rwnd (614). The transmitting device then transmits packets over the communication channel to the receiver in accordance with the size of the network window (616).

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method of controlling size of a receive window, comprising:
   at a transmitting device:
      transmitting packets over a communication channel from the transmitting device to a receiver;
      receiving acknowledgment packets from the receiver corresponding to the transmitted packets, the received acknowledgement packets from the receiver including an advertised receive window size;
      determining a backlog parameter for the receiver in accordance with a difference between the advertised receive window size and a predefined fraction of a receive buffer size, the receive buffer size corresponding to a size, or estimated size, of a receive buffer in the receiver;
      resetting the size of the receive window in accordance with a function of a current size of the receive window and the backlog parameter; and
      after the resetting, transmitting packets over the communication channel from the transmitting device to the receiver in accordance with the size of the receive window.

2. The method of claim 1, wherein the receive window has a dynamically determined size, distinct from the advertised receive window size received in the acknowledgment packets from the receiver.

3. The method of claim 1, including:
   determining a current round trip time for the transmitted packets; and
   resetting the size of the receive window in accordance with a scaling factor, the current round trip time, the current size of the receive window and the backlog parameter.

4. The method of claim 3, including determining the scaling factor, wherein the scaling factor is a nominal round trip time.

5. The method of claim 3, including determining the scaling factor, wherein when the backlog parameter's value corresponds to a backlog at the receiver that is greater than a predefined threshold, the scaling factor has a first value, and when the backlog parameter's value corresponds to a backlog at the receiver that is less than the predefined threshold, the scaling factor has a second value that is less than the first value.

6. The method of claim 1, wherein the resetting includes maintaining the current size of the receive window when the backlog parameter is within a predefined value range.

7. The method of claim 1, including resetting the size of the receive window only once every other round trip time.

8. The method of claim 1, including resetting the size of the receive window periodically.

9. The method of claim 1, including determining a congestion window size in accordance with one or more measurements of network congestion, and determining a transmission window size in accordance with both the congestion window size and the receive window size.

10. The method of claim 1, wherein the predefined fraction has a value between 0 and 1.

11. An apparatus for controlling size of a receive window, the apparatus comprising:
 a transceiver to transmit packets over a communication channel to a receiver, and to receive acknowledgment packets from the receiver corresponding to the transmitted packets, the received acknowledgement packets from the receiver including an advertised receive window size;
 one or more processors; and
 memory storing instructions to be executed by the one or more processors, the instructions to:
  determine a backlog parameter for the receiver in accordance with a difference between the advertised receive window size and a predefined fraction of a receive buffer size, the receive buffer size corresponding to a size, or estimated size, of a receive buffer in the receiver;
  reset the size of the receive window in accordance with a function of a current size of the receive window and the backlog parameter; and
  after the receive window size is reset, transmit packets over the communication channel to the receiver in accordance with the reset size of the receive window.

12. The apparatus of claim 11, further including instructions to:
 determine a current round trip time for the transmitted packets; and
 reset the size of the receive window in accordance with a scaling factor and the current round trip time.

13. The apparatus of claim 12, further including instructions to:
 determine the scaling factor, wherein the scaling factor is a nominal round trip time.

14. The apparatus of claim 12, further including instructions to:
 determine the scaling factor, wherein when the backlog parameter's value corresponds to a backlog at the receiver that is greater than a predefined threshold, the scaling factor has a first value, and when the backlog parameter's value corresponds to a backlog at the receiver that is less than the predefined threshold, the scaling factor has a second value that is less than the first value.

15. The apparatus of claim 11, wherein the instructions to reset the size of the receive window include instructions to maintain a current size of the receive window when the backlog parameter is within a predefined value range.

16. The apparatus of claim 11, wherein the instructions to reset the size of the receive window are executed only once every other round trip time.

17. The apparatus of claim 11, wherein the instructions to reset the size of the receive window are executed periodically.

18. The apparatus of claim 11, further including instructions to:
 determine a congestion window size in accordance with one or more measurements of network congestion, and determine a transmission window size in accordance with both the congestion window size and the receive window size.

19. The apparatus of claim 11, wherein the predefined fraction has a value between 0 and 1.

20. A non-transitory computer readable storage medium, storing one or more programs for execution by one or more processors of an apparatus that includes a transceiver to transmit packets over a communication channel to a receiver, and to receive acknowledgment packets from the receiver corresponding to the transmitted packets, the received acknowledgement packets from the receiver including an advertised receive window size, wherein the one or more programs include instructions for:
 determining a backlog parameter for the receiver in accordance with a difference between the advertised receive window size and a predefined fraction of a receive buffer size, the receive buffer size corresponding to a size, or estimated size, of a receive buffer in the receiver received by the apparatus;
 resetting the size of a receive window in accordance with a function of a current size of the receive window and the backlog parameter; and
 after the receive window size is reset, transmitting packets over the communication channel to the receiver in accordance with the reset size of the receive window.

21. The non-transitory computer readable storage medium of claim 20, wherein the one or more programs include instructions for:
 determining a current round trip time for the transmitted packets; and
 resetting the size of the receive window in accordance with a scaling factor and the current round trip time.

22. The non-transitory computer readable storage medium of claim 21, wherein the one or more programs include instructions for determining the scaling factor, wherein the scaling factor is a nominal round trip time.

23. The non-transitory computer readable storage medium of claim 21, wherein the one or more programs include instructions for determining the scaling factor, wherein when the backlog parameter's value corresponds to a backlog at the receiver that is greater than a predefined threshold, the scaling factor has a first value, and when the backlog parameter's value corresponds to a backlog at the receiver that is less than the predefined threshold, the scaling factor has a second value that is less than the first value.

24. The non-transitory computer readable storage medium of claim 20, wherein the instructions for resetting include instructions for maintaining the current size of the receive window when the backlog parameter is within a predefined value range.

25. The non-transitory computer readable storage medium of claim 20, wherein the one or more programs include instructions for resetting the size of the receive window only once every other round trip time.

26. The non-transitory computer readable storage medium of claim 20, wherein the one or more programs include instructions for resetting the size of the receive window periodically.

27. The non-transitory computer readable storage medium of claim 20, wherein the one or more programs include instructions for: determining a congestion window size in accordance with one or more measurements of network congestion, and determining a transmission window size in accordance with both the congestion window size and the receive window size.

28. The non-transitory computer readable storage medium of claim 20, wherein the predefined fraction has a value between 0 and 1.

29. A method of controlling transmission of messages from a sender to a recipient over a network, comprising:
at a transmitting device:
receiving acknowledgment packets from the receiver corresponding to transmitted packets, the received acknowledgement packets from the receiver including an advertised receive window size;
determining a backlog parameter for the receiver in accordance with a difference between the advertised receive window size packets and a predefined fraction of a receive buffer size, the receive buffer size corresponding to a size, or estimated size, of a receive buffer in the receiver;
determining a queuing delay in accordance the received acknowledgment packets;
resetting a size of a congestion window in accordance with a function of a current size of the congestion window and a factor proportional to the queuing delay;
resetting a size of a receive window in accordance with a function of a current size of the receive window and the backlog parameter, wherein the receive window has a dynamically determined size, distinct from the advertised receive window size in the acknowledgment packets received from the receiver;
comparing the size of the congestion window and the size of the receive window;
resetting a size of a network window in accordance with the smaller of the size of the congestion window and the size of the receive window; and
transmitting packets over the network to the recipient in accordance with the size of the network window.

30. An apparatus for controlling transmission of messages from a sender to a recipient over a network, comprising:
one or more processors; and
memory that stores one or more programs for execution by the one or more processors, the one or more programs including instructions for:
receiving acknowledgment packets from the receiver corresponding to transmitted packets, the received acknowledgement packets from the receiver including an advertised receive window size;
determining a backlog parameter for the receiver in accordance with a difference between the advertised receive window size and a predefined fraction of a receive buffer size, the receive buffer size corresponding to a size, or estimated size, of a receive buffer in the receiver;
determining a queuing delay in accordance the received acknowledgment packets;
resetting a size of a congestion window in accordance with a function of a current size of the congestion window and a factor proportional to the queuing delay;
resetting a size of a receive window in accordance with a function of a current size of the receive window and the backlog parameter, wherein the receive window has a dynamically determined size, distinct from the advertised receive window size in the acknowledgment packets received from the receiver;
comparing the size of the congestion window and the size of the receive window;
resetting a size of a network window in accordance with the smaller of the size of the congestion window and the size of the receive window; and
transmitting packets over the network to the recipient in accordance with the size of the network window.

31. A non-transitory computer readable storage medium, storing one or more programs for execution by one or more processors of an apparatus that includes a transceiver to transmit packets over a network to a receiver, and to receive acknowledgment packets from the receiver corresponding to the transmitted packets, the received acknowledgement packets from the receiver including an advertised receive window size, wherein the one or more programs include instructions for:
determining a backlog parameter for the receiver in accordance with a difference between the advertised receive window size and a predefined fraction of a receive buffer size, the receive buffer size corresponding to a size, or estimated size, of a receive buffer in the receiver;
determining a queuing delay in accordance the received acknowledgment packets;
resetting a size of a congestion window in accordance with a function of a current size of the congestion window and a factor proportional to the queuing delay;
resetting a size of a receive window in accordance with a function of a current size of the receive window and the backlog parameter, wherein the receive window has a dynamically determined size, distinct from the advertised receive window size in the acknowledgment packets received from the receiver;
comparing the size of the congestion window and the size of the receive window;
resetting a size of a network window in accordance with the smaller of the size of the congestion window and the size of the receive window; and
transmitting packets over the network to the recipient in accordance with the size of the network window.

* * * * *

UNITED STATES PATENT AND TRADEMARK OFFICE
CERTIFICATE OF CORRECTION

PATENT NO. : 8,730,799 B2
APPLICATION NO. : 13/040214
DATED : May 20, 2014
INVENTOR(S) : Jin et al.

Page 1 of 1

It is certified that error appears in the above-identified patent and that said Letters Patent is hereby corrected as shown below:

In the Claims

Column 15, line 28, claim 29, please delete "accordance the" and insert -- accordance with the --; and Column 16, line 5, claim 30, please delete "accordance the" and insert -- accordance with the --; and Column 16, line 38, claim 31, please delete "accordance the" and insert -- accordance with the --.

Signed and Sealed this
Twelfth Day of August, 2014

Michelle K. Lee
*Deputy Director of the United States Patent and Trademark Office*